THOMAS J. MORGAN
HENRY J. EMMEL
INVENTOR.

BY *Frank C. Parker*

ATTORNEY

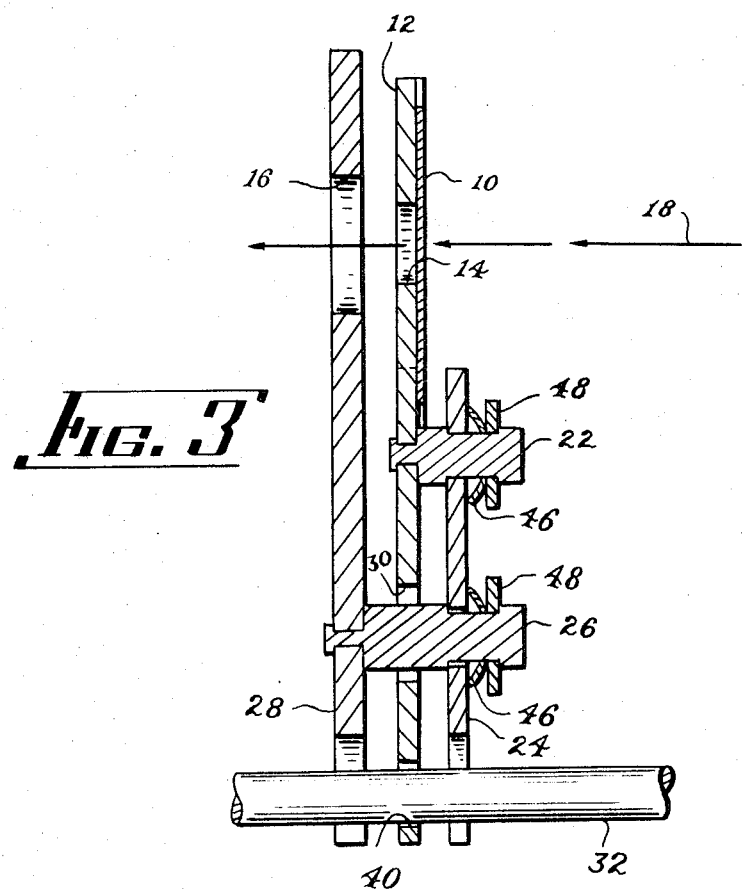

United States Patent Office

3,621,725
Patented Nov. 23, 1971

3,621,725
CONTROL MECHANISM
Henry J. Emmel, Irondequoit, and Thomas J. Morgan, Rochester, N.Y., assignors to Bausch & Lomb Incorporated, Rochester, N.Y.
Filed Jan. 2, 1970, Ser. No. 23
Int. Cl. F16h 27/02
U.S. Cl. 74—89.15  3 Claims

ABSTRACT OF THE DISCLOSURE

A control mechanism has a coarse adjustment mode and a fine adjustment mode actuated from a common grip. Two levers are provided. One of the levers is a follower lever and is pivotally mounted upon the other, a main lever, beyond a point at which the main lever is pivotally mounted upon a base. A gradient control means such as a gradient filter, is mounted at the end of the follower lever. An actuator pin connected to a grip drives both levers for a large magnification of movement, coarsely adjusting the gradient control means to a point slightly beyond a predetermined setting. The pin then disengages from the main lever and drives the follower lever in the opposite direction for a small magnification of movement, finely adjusting the gradient control means.

BACKGROUND OF THE INVENTION (1) Field of the invention

The field of this invention is control lever systems and more particularly those control lever systems having coarse and fine adjustment modes operable from a common grip.

(2) Description of the prior art

When a device incorporates a component which is to be set variably at particular precise numerical values among a fairly substantial range of consecutive numerical values, the choice of a control mechanism for that component presents a designers' dilemma. The available simple control mechanisms, such as direct drives, tend to be undesirably coarse, requiring an uncommon deftness of touch. On the other hand, an unduly fine control may result in a tediousness of manipulation of the control grip, especially when a substantial distance intervenes between two settings. One solution to the problem is to provide two control mechanisms, one for coarse adjustment and one for fine, but this introduces expensive complications in design, fabrication and operation of the device. It would be preferable to be able to combine both the coarse and fine adjustments as nearly as possible under the control of a single grip.

SUMMARY OF THE INVENTION

In our invention we provide a simple and economical control mechanism which derives both coarse and fine adjustments very largely from the same components.

An example of a device employing such a control mechanism is a spectrophotometer of the type whose operation involves the steps of (1) setting the desired wavelength, (2) introducing a reference of known transmittance, (3) varying the amount of light being directed to and through the reference so that the transmittance indicator reads 100%, (4) substituting a sample for the reference, and (5) reading the transmittance of the sample. In order to vary the light as required in step 3, a gradient density filter is mounted on a lever over an aperture, and moved back and forth across a light beam. As a more dense portion of the filter is presented to the light beam, less light passes through the filter enroute to the sample.

A lever system is employed to achieve coarse and fine adjustments in the setting of the gradient density filter. While levers are often employed to increase or decrease a force they also effect changes in the magnitude of the motions with which such forces are applied. All levers have an input point, an output point and a fulcrum. The degree of change in the magnitude of a motion is governed by the position of the fulcrum relative to the other two points. The ratio of output motion to input motion becomes greater as the fulcrum approaches the input point. Fine adjustment mechanisms must have a relatively small ratio of output motion to input motion, while the converse is true of coarse adjustment mechanisms. In a control lever system both can be combined in one mechanism if a means is found to shift the effective position of the fulcrum relative to the input and output points.

In the above-described spectrophotometer the light control system comprises a follower lever which defines the aperture over which the filter is mounted, and which is pivotally mounted upon a main lever, which in turn is pivotally mounted to a base. Both levers are engageable with an actuator pin driven from a grip, such as a rotary control knob. A coarse adjsutment mode is achieved when the actuator pin, providing the input motion, is driven against a protrusion of the main lever, whose pivotal mount to the base is relatively near the pin, causing the main lever, the follower lever and its attendant filter to be driven along an arcuate path transverse to the light beam. The filter is carried beyond the actually desired setting. Having surpassed the desired setting, movement in the fine adjustment mode is accomplished by reversing the knob direction so that the pin disengages from the main lever's protrusion and drives the follower lever, whose pivotal mount to the main lever is relatively remote from the pin, and whose input-output ratio is significantly less than that of the main lever, until the exact predetermined setting is achieved.

BRIEF DESCRIPTION OF THE DRAWINGS

FIG. 3 is a sectional view of the control mechanism taken on line 3—3 of FIG. 2, and pointing in the direction of the arrows.

DETAILED DESCRIPTION OF THE PREFERRED EMBODIMENT

Figure 1:
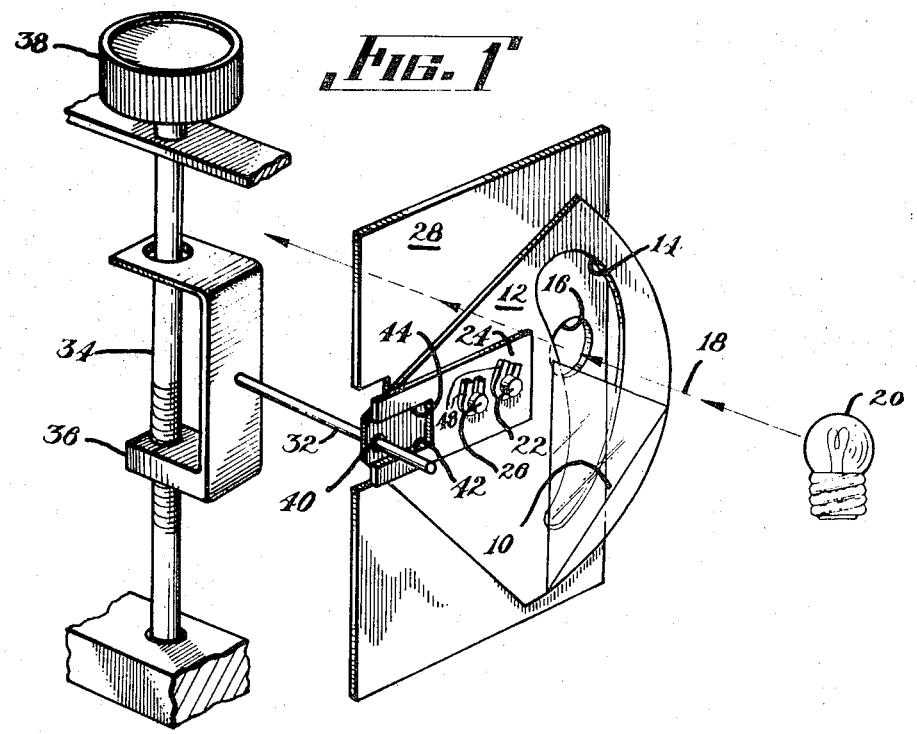
FIG. 1 is a perspective view of the control mechanism as it appears in a spectrophotometer.
Figure 2:
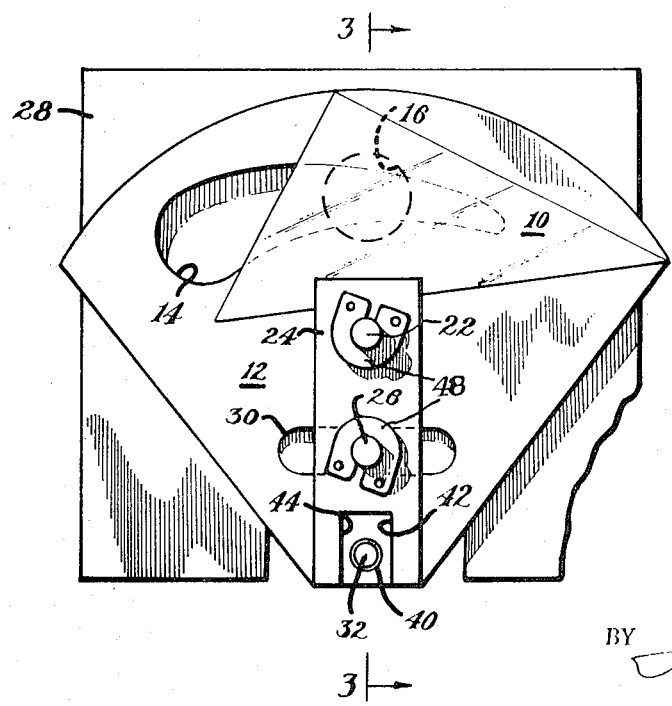
FIG. 2 is a side view of the control mechanism showing the relative positions of the control mechanism components as they appear in the fine adjustment mode.

Referring to the drawings, the preferred embodiment is shown in FIG. 1 wherein a gradient density filter 10 is mounted at the end of a follower lever 12, partly covering follower lever aperture 14 whose general shape is that of an arcuate wedge, narrowing toward one end. The gradient filter 10 and follower lever aperture 14 are arranged to cover all or part of base aperture 16 through which light beam 18 is directed from a light source 20 to a photocell or other appropriate sensor.

Follower lever 12 is pivotally mounted by follower pivot 22 to main lever 24 which in turn is pivotally mounted by a base pivot 26 to a base 28. Cut-out 30 is located in follower lever 12 so that follower lever 12 is free to pivot independently of main lever 24. Cut-out 30 could be omitted if it were convenient to mount follower lever 12 outboard of main lever 24. Actuator pin 32 is driven by the action of shaft 34 against nut 36 when knob 38 is rotated. It engages first with pin-holding aperture 40 causing follower lever 12 to pivot about follower pivot 22. Pin 32 then engages either the lower face 42 or the upper face 44 of an aperture in main lever 24. A slight lateral motion of pin 32, induced by its arcuate path around the pivot points, is accommodated by the ability of nut 36 to turn slightly about the axis of shaft 34. Spring washers 46 urge against retainers 48 to hold pivots 22 and 26 securely in position.

Pin 32 engages with either face 42 or face 44 to produce pivotal motion of main lever 24 about base pivot 26. Because follower lever 12 is held at both aperture 40 and pivot 22 to main lever 24, the gradient light control, comprising aperture 14 and filter 10, is carried past base aperture 16, changing the intensity of light beam 18 passing through aperture 16. The rotation of knob 38 and the movements along the attendant chain of cooperating members proceeds until the intensity of light passing along beam 18 through aperture 16 has been changed, as a coarse adjustment, slightly beyond the desired registration upon a meter or display means.

When the desired registration has been slightly surpassed, the coarse adjustment is concluded. For operation in the fine adjustment mode the rotation of knob 38 is reversed, causing shaft 34 to rotate in the opposite direction, driving pin 32 independently of main lever 24. Since the force of pin 32 is not acting against pivot 26, the amount of movement imparted to follower lever 12 and its attendant control means, is reduced compared with the motion about pivot 26 for any given amount of rotation of knob 38. Therefore, so much of the rotation of knob 38 as allows pin 32 to travel within the range delimited by the faces 42 and 44, results in a fine adjustment of the control means.

The location of base pivot 26 is important since its closeness to pin 32 determines the ratio of movement of filter 10 to the movement of pin 32. When operating in the coarse adjustment mode follower lever 12 is tied to main lever 24 by pin 32 and follower pivot 22. Accordingly, the combination of the two levers 24 and 12, while in the coarse adjustment mode, may be considered as a single lever whose fulcrum is base pivot 26. The ratio $F/P$ comparing the movement F of filter 10 with the movement P of pin 32 varies directly with the ratio $f/p$ which compares the distance $f$ from base pivot 26 to filter 10 with the distance $p$ from pin 32 to base pivot 26, according to the formula $$F/P = f/p$$

Similarly, the ratio of movements in the film fine adjustment mode, which derive from the independent motion of follower lever 12, are governed by the same formula with the distances $f$ and $p$ being calculated to and from follower pivot 22 instead of base pivot 26. Since follower pivot 22 is closer to filter 10 than is base pivot 26, it is easy to see that for any given motion of pin 32, considerably less motion of filter 10 will result when motion is transmitted in the fine mode than when the coarse mode is employed. Accordingly, the generally arcuate shape of follower lever aperture 14 should be more or less centered upon base pivot 26 since the greatest motion of the aperture and filter will be pivotal about that point.

As may be readily perceived, different forms of cooperating levers, gradient control means, actuating means and mounting configurations could be employed in the practice of our invention without departing from the spirit and scope thereof.

We claim:

1. A control mechanism comprising in combination, a base,
a follower lever having an input end and an output end,
gradient control means mounted upon said follower lever at said output end,
a main lever having an input end and an output end pivotally mounted upon said base by a first pivot and defining at said input end a wide aperture engageable with an actuating member,
said follower lever being drivably connected at said input end to said actuating member, and being pivotally mounted upon said main lever by a second pivot, said second pivot being disposed between said first pivot and said output end of said main lever,
said actuating member being engageable with edges of said wide aperture for driving both said levers about the first pivot for coarse adjustment of said gradient control means, and
said edges of said wide aperture of said main lever defining a range for movement of said actuating member for driving said follower lever about said second pivot independently of said main lever to a fine adjustment of said gradient control means.

2. A two-pivot levered control mechanism comprising:
a first lever having an input end and an output end and being constrained for pivotal movement about a first pivot on a base;
a second lever pivotally mounted upon said first lever at a second pivot point, said second pivot point being disposed upon said first lever between said first pivot point and said output end of said first lever,
said second lever having an input end and an output end, said output end comprising means effective to induce a desired adjustment when moved relative to a predetermined point;
said input ends of said first and second levers being proximate to one another and both of said input ends being drivably connected to a single common activating member;
said input end of said first lever comprising protrusions, defining a limited range of travel for said activating member for driving said second lever about said second pivot independently of said first lever for a fine adjustment, and said protrusions being effective to receive said actuating member for driving both of said levers together to effect a coarse adjustment.

3. A control mechanism comprising:
a coarse adjustment pivot on a base;
a first lever constrained for arcuate motion about said coarse adjustment pivot, said first lever having a power receiving end and a power delivering end;
a fine adjustment pivot on said first lever between said delivering end and said coarse adjustment pivot;
a second lever constrained for arcuate movement about said fine adjustment pivot, having a power receiving end and a power delivering end, and having means at said delivering end for effecting an adjustment;
common driving means engageable with both levers at their power receiving ends for pivotal motion of both levers simultaneously about said coarse adjustment pivot to effect a course adjustment of said adjustment means, said driving means being further engageable with said second lever for motion about said fine adjustment pivot independently of said first lever, and within a range of movement defined by said first lever, to effect a fine adjustment of said adjustment means.

References Cited

UNITED STATES PATENTS

| | | | |
|---|---|---|---|
| 2,162,908 | 6/1939 | Bedford et al. | 95—45 |
| 2,259,415 | 10/1941 | Eddy | 95—45 |
| 3,176,312 | 3/1965 | Reinsch | 350—272 |
| 3,237,182 | 2/1966 | Berlucchi | 350—272 |
| 3,402,613 | 9/1968 | Neusel et al. | 74—89.15 |

FOREIGN PATENTS

| | | | |
|---|---|---|---|
| 856,721 | 12/1960 | Great Britain | 74—89.15 |

WILLIAM F. O'DEA, Primary Examiner

W. S. RATLIFF, JR., Assistant Examiner

U.S. Cl. X.R.

350—272; 95—45